United States Patent
Gupta et al.

(10) Patent No.: US 11,304,221 B2
(45) Date of Patent: Apr. 12, 2022

(54) TECHNIQUES FOR UPDATING SEMI-PERSISTENT SCHEDULING (SPS) CONFIGURATION IN WIRELESS COMMUNICATIONS

(71) Applicant: QUALCOMM Incorporated, San Diego, CA (US)

(72) Inventors: Piyush Gupta, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/433,850

(22) Filed: Jun. 6, 2019

(65) Prior Publication Data

US 2019/0380141 A1 Dec. 12, 2019

Related U.S. Application Data

(60) Provisional application No. 62/683,592, filed on Jun. 11, 2018.

(51) Int. Cl.
*H04W 72/12* (2009.01)
*H04W 72/04* (2009.01)
*H04L 5/00* (2006.01)

(52) U.S. Cl.
CPC ... *H04W 72/1284* (2013.01); *H04W 72/1257* (2013.01)

(58) Field of Classification Search
CPC ......... H04W 72/1284; H04W 72/1257; H04W 72/0406; H04L 5/0053; H04L 5/0055
See application file for complete search history.

(56) References Cited

U.S. PATENT DOCUMENTS

| 2011/0038334 | A1* | 2/2011 | Huang | H04W 72/04 370/329 |
| 2014/0086222 | A1* | 3/2014 | Bao | H04W 72/0413 370/336 |
| 2014/0140336 | A1* | 5/2014 | Callard | H04L 25/0202 370/343 |
| 2017/0026992 | A1* | 1/2017 | Jiang | H04L 5/0055 |

(Continued)

FOREIGN PATENT DOCUMENTS

| WO | 2017191917 A1 | 11/2017 | |
| WO | WO-2017191917 A1 * | 11/2017 | ........... H04L 5/0055 |
| WO | WO-2019156515 A1 * | 8/2019 | ........ H04W 72/0406 |

OTHER PUBLICATIONS

International Search Report and Written Opinion—PCT/US2019/036329—ISA/EPO—dated Aug. 8, 2019.

(Continued)

*Primary Examiner* — Harry H Kim
(74) *Attorney, Agent, or Firm* — Arent Fox, LLP

(57) ABSTRACT

Aspects described herein relate to reporting feedback for semi-persistent scheduling (SPS) configuration updates. SPS communications can be activated over SPS resources with an access point. SPS update resources related to a configured periodicity for receiving SPS updates to SPS resource grants over a control channel can be determined. It can also be determined whether a SPS update is received in the SPS update resources over the control channel. Feedback can be transmitted to the access point, where the feedback indicates whether the SPS update is received over the SPS update resources.

30 Claims, 7 Drawing Sheets

(56) References Cited

U.S. PATENT DOCUMENTS

| | | | |
|---|---|---|---|
| 2017/0207843 A1* | 7/2017 | Jung | H04B 7/0695 |
| 2018/0042043 A1* | 2/2018 | Babaei | H04W 72/1289 |
| 2018/0124648 A1 | 5/2018 | Park et al. | |
| 2020/0045706 A1* | 2/2020 | Shin | H04W 4/70 |
| 2020/0078909 A1* | 3/2020 | Park | H04W 36/0011 |

OTHER PUBLICATIONS

ZTE: "SPS Enhancements for V2X Over Uu", 3GPP Draft; R2-165402 SPS Enhancements for V2X Over Uu, 3rd Generation Partnership Project (3GPP), Mobile Competence Centre; 650, Route Des Lucioles; F-06921 Sophia-Antipolis Cedex; France, vol. Ran WG2, No. Goteborg; Aug. 22, 2016-Aug. 26, 2016, Aug. 21, 2016, XP051140966, 4 pages, Retrieved from the Internet: URL: http://www.3gpp.org/ftp/Meetings_3GPP_SYNC/RAN2/Docs/ [retrieved on Aug, 21, 2016] figure 1 p. 2, lines 5-10, 23, 29-31.

\* cited by examiner

TECHNIQUES FOR UPDATING SEMI-PERSISTENT SCHEDULING (SPS) CONFIGURATION IN WIRELESS COMMUNICATIONS

CLAIM OF PRIORITY UNDER 35 U.S.C. § 119

The present application for patent claims priority to Provisional Application No. 62/683,592, entitled "TECHNIQUES FOR UPDATING SEMI-PERSISTENT SCHEDULING (SPS) CONFIGURATION IN WIRELESS COMMUNICATIONS" filed Jun. 11, 2018, which is assigned to the assignee hereof and hereby expressly incorporated by reference herein for all purposes.

BACKGROUND

Aspects of the present disclosure relate generally to wireless communication systems, and more particularly, to semi-persistent scheduling (SPS) resources in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In wireless communications technologies, such as 5G, long term evolution (LTE), etc., devices can be configured for semi-persistent scheduling (SPS) to reduce load on control channels by configuring devices to receive resource scheduling grants at defined periodicities. As such, SPS is being used to support periodic communications, which may be useful in factory automation and/or in communications to/from machine-type communication (MTC) devices where communication resources may only be periodically desired. Thus, SPS communications can be configured in such scenarios so as not to overload the control channel with more frequent/regular resources grants that may not be needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for reporting feedback for semi-persistent scheduling (SPS) configuration updates is provided. The method includes activating SPS communications over SPS resources with an access point, determining SPS update resources related to a configured periodicity for receiving SPS updates to SPS resource grants over a control channel, determining whether a SPS update is received in the SPS update resources over the control channel, and transmitting feedback to the access point, wherein the feedback indicates whether the SPS update is received over the SPS update resources.

In another example, a method for updating a SPS configuration is provided. The method includes activating SPS communications over SPS resources with a user equipment (UE), indicating SPS update resources related to a configured periodicity for transmitting SPS updates to SPS resource grants over a control channel, transmitting an SPS update over the SPS update resources, determining whether feedback, indicating whether the SPS update is received over the SPS update resources, is received from the UE, and transmitting a next SPS update based on determining whether the feedback is received.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
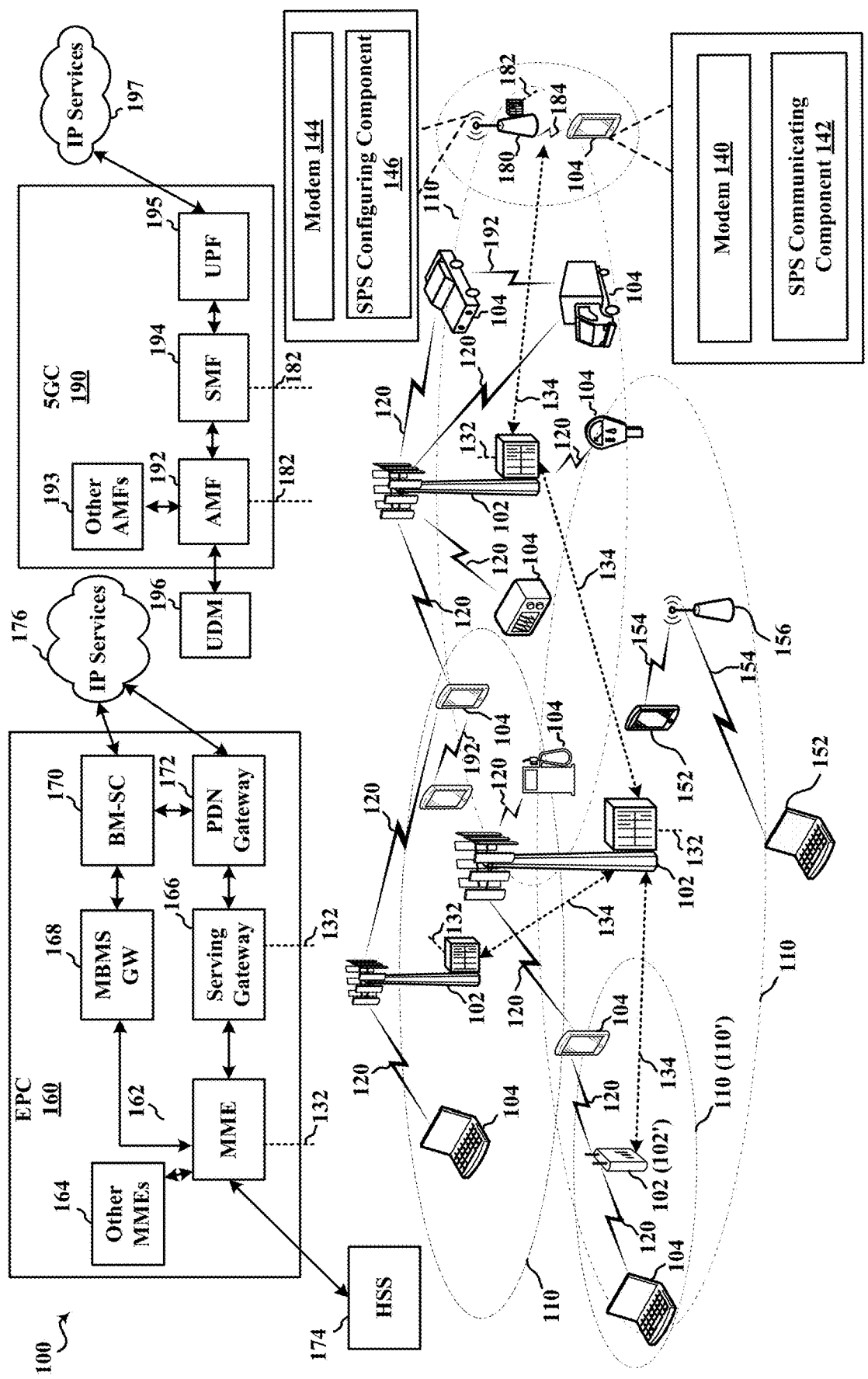
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring SPS resources with higher reliability, which may improve use in some mission-critical configurations, such as factory automation. For example, periodic SPS configuration updates can be defined along with a feedback mechanism for indicating whether a given SPS configuration update is received. In this example, an access point can determine whether one or more devices received the SPS configuration update for communicating data over the corresponding SPS resources (e.g., where an acknowledgement (ACK) or negative ACK (NACK) is provided as the feedback). Where NACK or no feedback is received for a SPS configuration update, in an example, the access point can attempt to retransmit the SPS configuration update and/or transmit a new SPS configuration update to the one or more devices. This can improve likelihood of the one or more devices receiving the SPS configuration update, and transmitting communications over the corresponding SPS resources, which can improve reliability of the communications.

For example, in a factory automation environment, various devices can communicate with one another, and/or with a factory automation management system, using a wireless communication technology that may employ a SPS configuration. For example, the factory automation management system may be an industrial personal computer (PC) that provides controller programming, software and security management, long term key performance indicator (KPI) monitoring, etc. In addition, the factory automation environment may include multiple human machine interfaces (HMI) that communicate with the factory automation management system, and may include tablet, panels, wearable devices, etc., that can provide machine control on the factory floor (e.g., start/stop certain machines), mode changes for given machines (e.g., from widget 1 to widget 2), augmented reality (AR) and/or virtual reality (VR) scenarios for controlling factory systems, etc. The factory automation environment may also include one or more programmable logic controllers (PLC) that may include custom hardware for issuing commands (e.g., motion) to machine actuators and/ or receiving sensor inputs in real time, and/or coordinating with other PLCs to read/control machines. The factory automation environment may also include the sensors and/or actuators that control the machines (e.g., rotary motion, servo motors, position sensors, etc.). Traffic among the various nodes of the factory automation environment can be mission-critical and mostly periodic, including cyclic exchanges among PLCs/sensors/actuators. The factory can have multiple production cells (e.g., about 100-1000), where a cell size can be around 10 meters×10 meters×3 meters in volume, and there can be about 20-50 nodes per cell. The factory automation environment can also include non-mission-critical traffic. In one example, the mission-critical specifications for a factory automation environment may be similar to the following:

| | PLC to Sensor/Actuator | Inter-PLC | PLC to higher entities (e.g., management system) |
|---|---|---|---|
| Round-Trip Time (RTT) | 0.5 to 10 milliseconds (ms) | 4 to 10 ms | Similar to enhanced mobile broadband (eMBB) cases (file downlink, hypertext markup language (HTML)) and also extends to AR/VR |
| Packet Error Rate (PER) Target | 10e−6 | 10e−6 | |
| Packet Size Range | 40 to 256 bytes Max 100 meters (m), typically 10 m to 15 m | 1 kilobyte Typically 100 m | |

In some factory automation environments, coordinated multiple point (CoMP) has been implemented to improve ergodic capacity. In this example, reliability can be achieved through spatial diversity, e.g., at the scale of shadowing, through multi-transmission/reception point (TRP)/gNB coordinated transmission, etc. Given the periodicity of factory automation traffic, SPS can be configured for the communications to conserve radio frequency resources and control channel loading. In one example, an initial transmission can be based on SPS with no control channel necessarily needed, and retransmissions can be scheduled using a control channel based on feedback for the initial transmission. In another example, traffic-aware channel state information (CSI) framework based on SPS/evolved SPS (eSPS) can be used where CSI-reference signals (CSI-RS) (and/or sounding reference signals (SRS)) are scheduled just before and during each scheduled traffic window to get updated channel information. For example, eSPS may allow for additionally indicating offsets to SPS periodicity to facilitate providing additional configuration opportunities for SPS communications. Based on the updated channel state information, a control channel with SPS update can be sent to a device (e.g., with the same periodicity as CSI updates). In an example, aspects described herein can be used to improve a likelihood that SPS updates are reliably received.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, in accordance with various aspects described herein, an example wireless communication access network 100 includes at least one UE 104 with a modem 140 for communicating in a wireless network and a SPS communicating component 142 for communicating over configured SPS resources, as described further herein. Further, wireless communication access network 100, also referred to as a wireless wide area network (WWAN), includes at least one base station 102 via which the UE 104 can communicate with one or more nodes of the wireless communication access network to communicate data corresponding to the service. The base station 102 can also have a modem 144 for communicating in the wireless network and a SPS configuring component 146 for configuring SPS resources over which one or more UEs 104 can communicate, as described further herein. In this regard, for example, SPS configuring component 146 can configure SPS resources and parameters related to sending periodic SPS updates for one or more UEs 104, and the SPS communicating component 142 can communicate using the configured SPS resources and update the SPS resource or related communication parameters based on the SPS updates received from the base station 102. In one specific example, this may be particularly useful for providing mission-critical SPS communications (e.g., in factory automation) where the periodic SPS updates and/or corresponding feedback can be used to assess connectivity issues between the base station 102 and one or more UEs 104. Additionally, in this example, the one or more UEs 104 may include and/or may be provided within factory automation management systems, PLCs, HMIs, sensors/actuators, etc., as described.

The one or more UEs 104 and/or the one or more base stations 102 may communicate with other UEs and/or other base stations via an Evolved Packet Core (EPC) 160. The base stations 102 (which can be collectively referred to as Evolved Universal Mobile Telecommunications System (UMTS) Terrestrial Radio Access Network (E-UTRAN)) may interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless. In another example, The one or more UEs 104 and/or the one or more base stations 102 may communicate with other UEs and/or other base stations via a 5G Core (5GC) 190. The base stations 102 configured for 5G NR (which can collectively be referred to as Next Generation RAN (NG-RAN)) may interface with the 5GC 190 through backhaul links 182.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Y*x MHz (where x can be a number of component carriers) used for transmission in each direction. The carriers may or may not be adjacent to or contiguous with each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 156 in communication with Wi-Fi stations (STAs) 152 via communication links 154 in a 5 GHz unlicensed frequency spectrum. When communicating in an unlicensed frequency spectrum, the STAs 152/AP 156 may perform a clear channel assessment (CCA) prior to communicating in order to determine whether the channel is available. In one example, aspects described herein in the context of a base station 102 may be employed, where appropriate, by an AP 156. Similarly, for example, aspects described herein in the context of a UE 104 may be employed, where appropriate, by a STA 152.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 156. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as a mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 can be a control node that processes signaling between the UEs 104 and the EPC 160. Generally, the MME 162 can provide bearer and connection management. User Internet protocol (IP) packets (e.g., of or relating to the UE 104) can be transferred through the Serving Gateway 166, which itself is connected to the PDN Gateway 172. The PDN Gateway 172 can provide UE IP address allocation as well as other functions. The PDN Gateway 172 and the BM-SC 170 can be connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

In a 5GC, which may be provided in addition or alternatively to the EPC 160, for example, a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 and/or 5GC 190 for one or more UEs 104. Examples of UEs 104 include factory equipment or nodes, as described above, a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
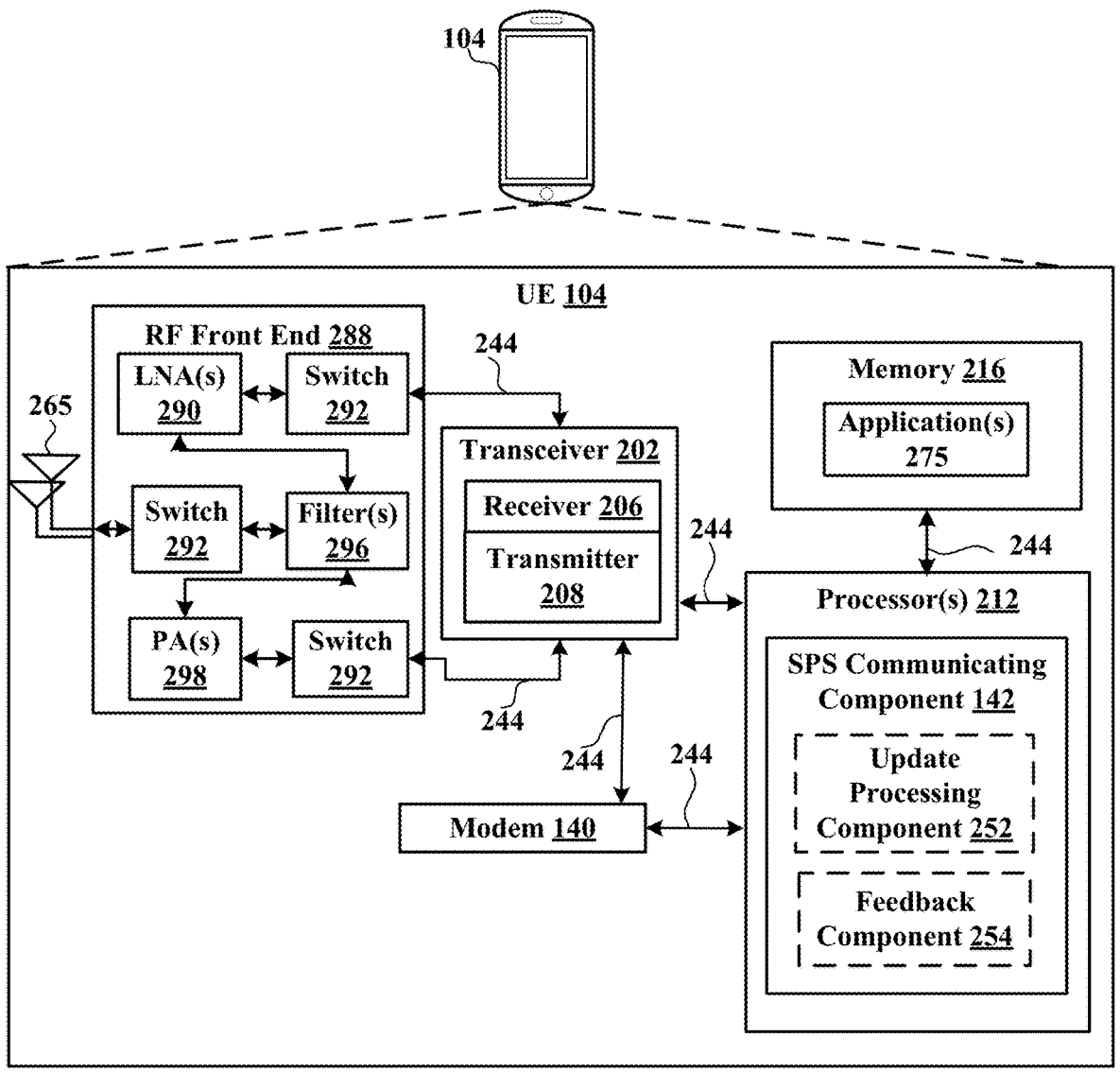
FIG. 2 is a block diagram illustrating an example of a UE, in accordance with various aspects of the present disclosure.
Figure 3:
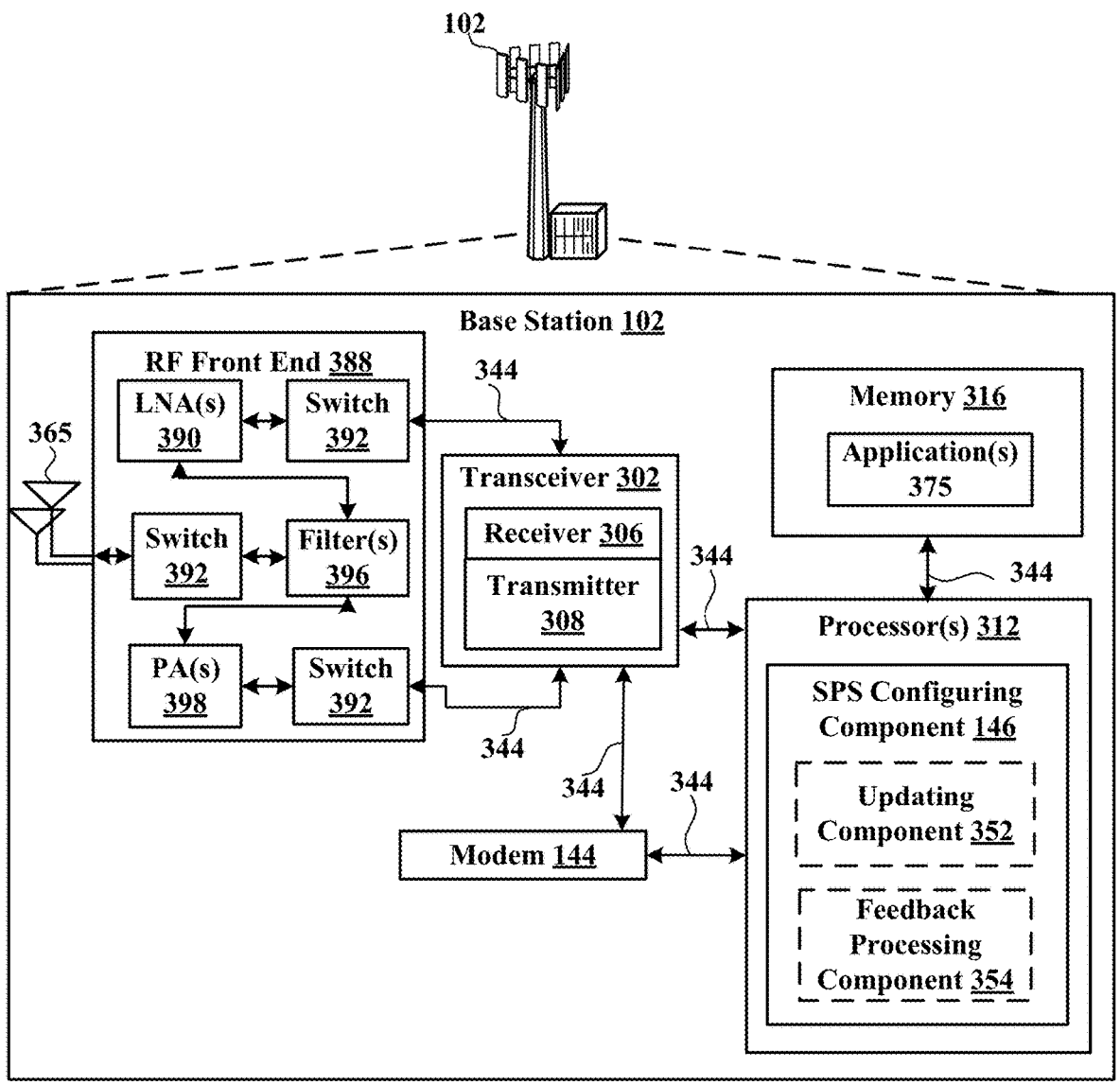
FIG. 3 is a block diagram illustrating an example of a base station, in accordance with various aspects of the present disclosure.
Figure 4:
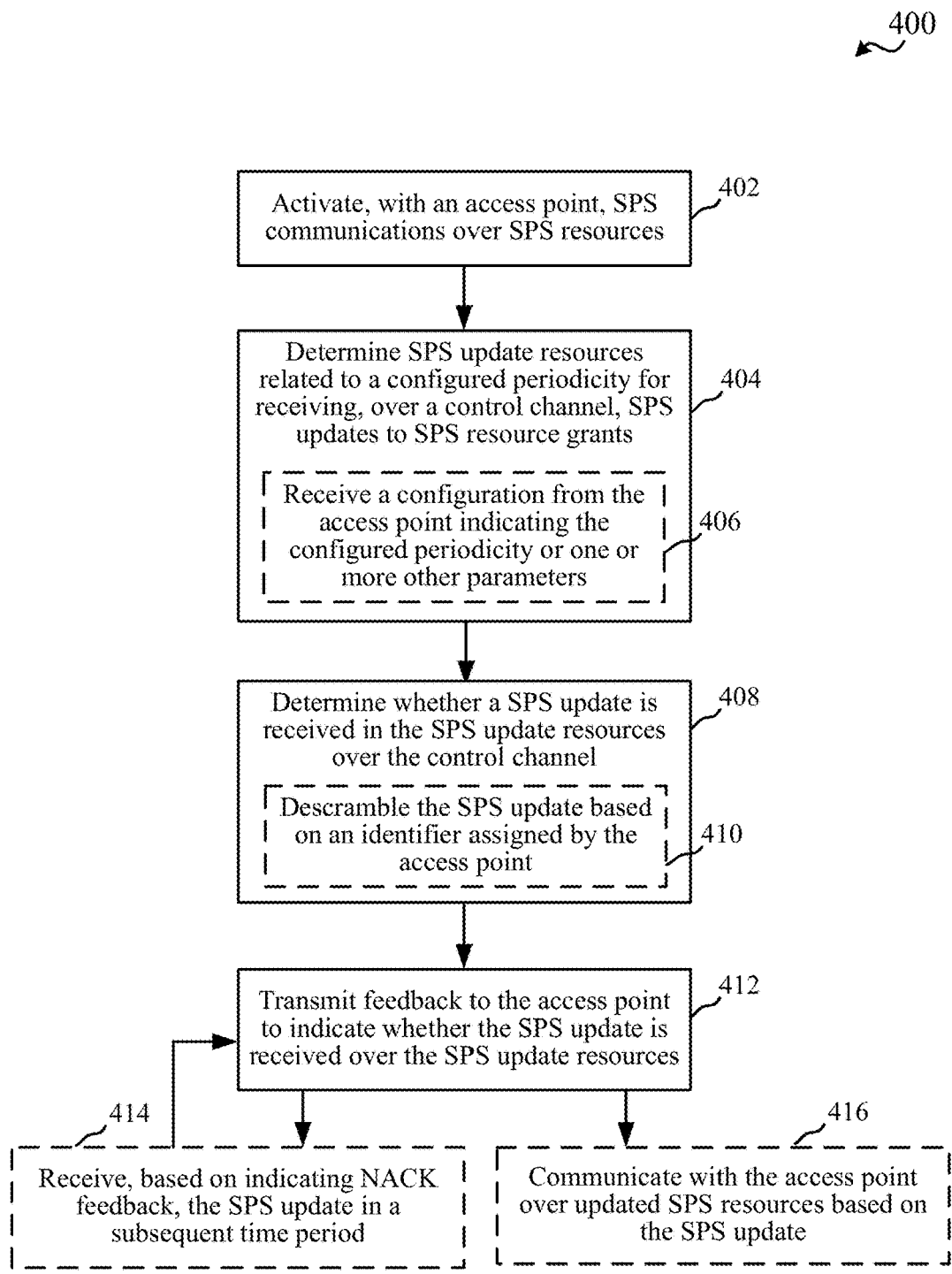
FIG. 4 is a flow chart illustrating an example of a method for communicating over configured semi-persistent scheduling (SPS) resources, in accordance with various aspects of the present disclosure.
Figure 5:
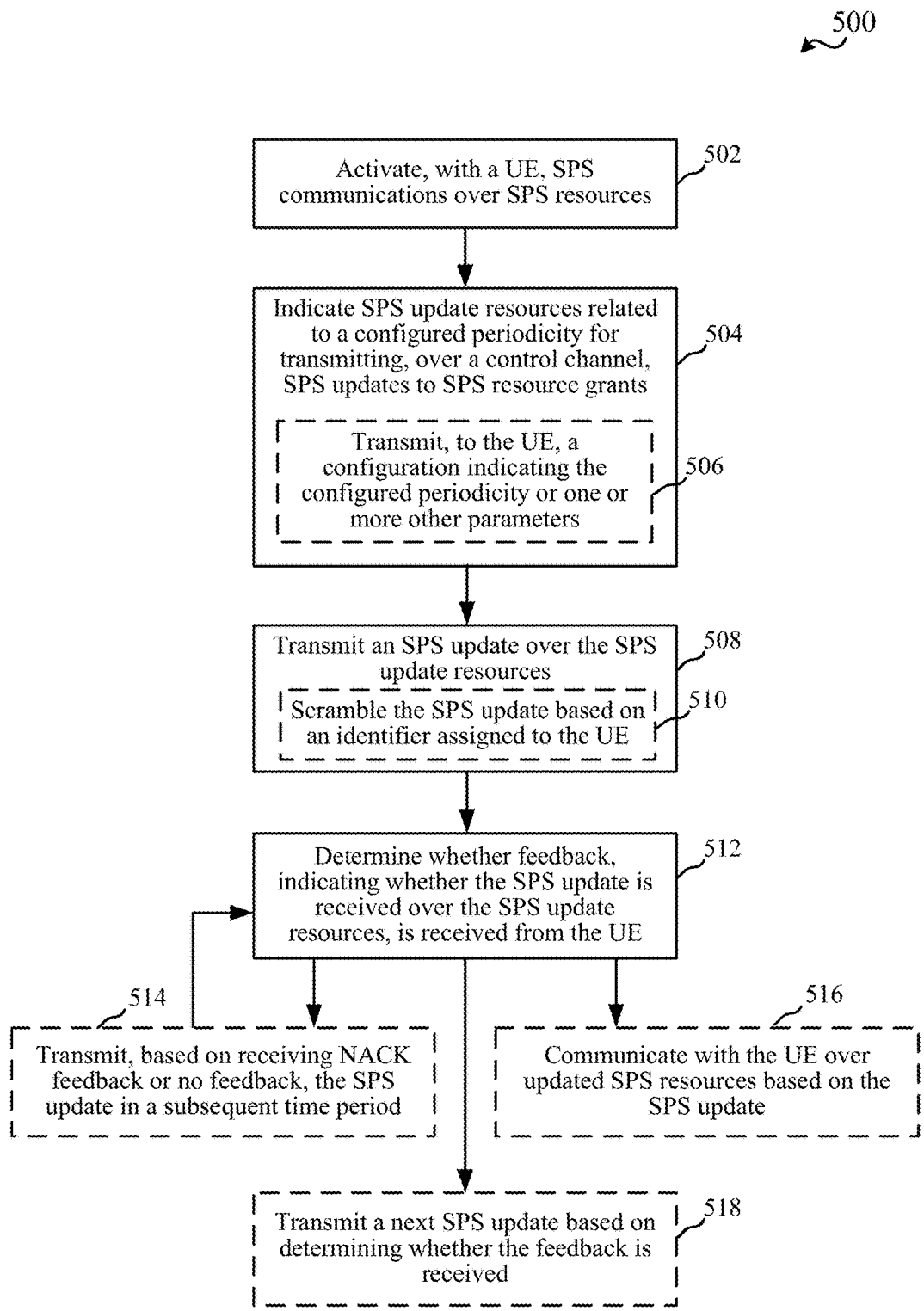
FIG. 5 is a flow chart illustrating an example of a method for configuring SPS resources, in accordance with various aspects of the present disclosure.
Figure 6:
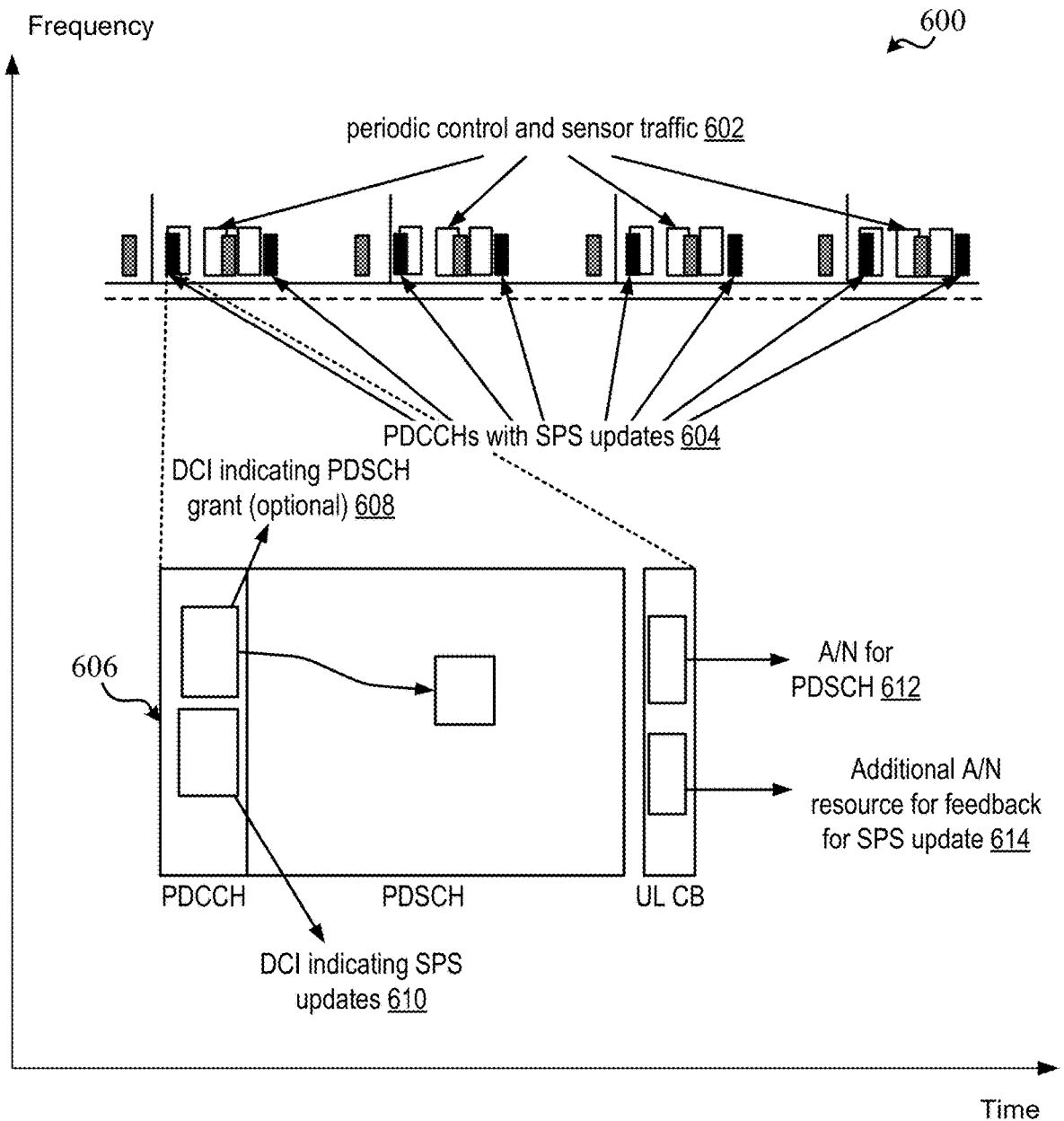
FIG. 6 illustrates an example of a resource allocation, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 140 and/or SPS communicating component 142 to enable one or more of the functions described herein related to configuring SPS communications, receiving SPS configuration updates, etc. Further, the one or more processors 212, modem 140, memory 216, transceiver 202, RF front end 288 and one or more antennas 286, may be configured to support voice and/or data calls (simultaneously or non-simultaneously) in one or more radio access technologies.

In an aspect, the one or more processors 212 can include a modem 140 and/or can be part of the modem 140 that uses one or more modem processors. Thus, the various functions related to SPS communicating component 142 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with SPS communicating component 142 may be performed by transceiver 202.

Also, memory 216 may be configured to store data used herein and/or local versions of applications 275 or SPS communicating component 142 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining SPS communicating component 142 and/or one or more of its subcomponents, and/or data associated therewith, when UE 104 is operating at least one processor 212 to execute SPS communicating component 142 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, SNR, RSRP, RSSI, etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, SPS communicating component 142 can optionally include an update processing component 252 for processing SPS configuration updates received from a base station (e.g., for determining resources over which to transmit SPS communications and/or related parameters), and/or a feedback component 254 for communicating feedback related to receiving and/or processing the SPS configuration updates.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 may include a variety of components, some of which have already been described above, but including components such as one or more processors 312 and memory 316 and transceiver 302 in communication via one or more buses 344, which may operate in conjunction with modem 144 and SPS configuring component 146 for configuring a UE with SPS resources for communicating with the base station 102.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, SPS configuring component 146 can optionally include an updating component 352 for updating an SPS configuration for a UE, and/or a feedback processing component 354 for processing feedback received from the UE as related to the updated SPS configuration.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for configuring and utilizing communications over SPS resources. In an example, a UE 104 can perform the functions described in method 400 using one or more of the components described in FIGS. 1-2.

In method 400, at Block 402, SPS communications with an access point can be activated over SPS resources. In an aspect, SPS communicating component 142, e.g., in conjunction with processor(s) 212, memory 216, transceiver 202, etc., can activate, with the access point (e.g., base station 102), SPS communications over SPS resources. For example, in activating SPS communications, the SPS communicating component 142 can receive SPS configuration parameters from the base station 102, such as a periodicity and/or duration of time for checking a control channel for SPS communication resources or a corresponding SPS resource grant, an identifier for the UE 104 that can be used to indicate a SPS resource grant or related parameters intended for the UE 104 (e.g., a SPS-radio network temporary identifier (SPS-RNTI) used to scramble the SPS resource grant), and/or the like. In an example, SPS communicating component 142 can receive the parameters from the base station 102 in higher layer signaling (e.g., RRC signaling) from the base station 102 once a connection is established between the UE 104 and base station 102. In addition, in activating the SPS communications for example, SPS communicating component 142 can receive the SPS resource grant from the base station 102 based on the parameters (e.g., the periodicity), and can decode the SPS resource grant (e.g., from a control channel) based on the SPS-RNTI.

Activating and/or configuring SPS resources in this regard may allow the UE 104 to use less radio resources by deactivating or reducing power to certain portions of the UE 104 (e.g., transceiver and/or RF front end portions) during times when the SPS resource grants are not expected to be received, as determined based on the periodicity, a time during which SPS resource grants can be transmitted, and/or related parameters configured by the base station 102. Moreover, for example, SPS resources can be granted for the purpose of receiving downlink communications from the base station 102 (e.g., in a physical downlink control channel (PDCCH), physical downlink shared channel (PDSCH), etc.) and/or for transmitting uplink communications to the base station 102 (e.g., in a physical uplink control channel (PUCCH), physical uplink shared channel (PUSCH), etc.).

In method 400, at Block 404, SPS update resources can be determined as related to a configured periodicity for receiving, over a control channel, SPS updates to SPS resource grants. In an aspect, update processing component 252, e.g., in conjunction with processor(s) 212, memory 216, transceiver 202, SPS communicating component 142, etc., can determine the SPS update resources related to the configured periodicity for receiving, over the control channel (e.g., over a PDCCH), SPS updates to SPS resource grants. For example, the SPS update resources can relate to configured resources over which the base station 102 can transmit updates to the SPS configuration over the control channel (also referred to herein as SPS updates), and/or can expect a feedback response from the UE 104. As described, using such updates and/or the feedback mechanism can improve reliability of the SPS communications between UE 104 and base station 102.

In an example, determining the SPS update resources at Block 404 can optionally include, at Block 406, receiving a configuration from the access point indicating the configured periodicity or one or more other parameters. In an aspect, update processing component 252, e.g., in conjunction with processor(s) 212, memory 216, transceiver 202, SPS communicating component 142, etc., can receive the configuration from the access point (e.g., base station 102) indicating the configured periodicity or the one or more other parameters. For example, base station 102 can transmit the configuration to indicate the periodicity of the SPS updates, which may or may not include, or may or may not be based on, the periodicity configured for SPS communications, as described above. In one example, resources over which the SPS updates are scheduled may be indicated by the configured periodicity and/or by a starting resource, where the starting resource indicated in the configuration may include an index of the starting resource in frequency (e.g., an indication of a resource block or resource block group, an indication of a subcarrier in a system bandwidth, etc.) and/or in time (e.g., an index of a slot or a symbol within a slot, as described below). Moreover, in an example, the configured periodicity and/or starting resource, may be different from the resources over which SPS communications are configured with the base station 102, such that the UE 104 can receive updated configuration information for applying in subsequent SPS communications. In any case, the configuration can be received in higher layer signaling (e.g., RRC signaling).

In addition, the configuration may also include an offset from the periodicity at which the SPS updates are scheduled to be sent to the UE 104, and thus the UE 104 can determine the SPS update resources based on the periodicity and/or the corresponding offset, both of which can be a unit of time specified as a number of milliseconds, a number of symbols, a number of slots (where a symbol within the slot can be known or otherwise configured), etc. For example, a symbol and slot can be defined by a wireless communication technology. In one example, a symbol can be an orthogonal frequency division multiplexing (OFDM) or single-carrier frequency division multiplexing (SC-FDM) symbol defined to include a set of frequency resources over a period of time (e.g., 1 ms), and a slot can include a plurality of adjacent symbols (e.g., 12 or 14 symbols depending on a cyclic prefix utilized). Moreover, the SPS updates can be valid until a next SPS update is received (or is scheduled to be received based on the configured periodicity and/or offset). In yet another example, the configuration may include a delay before which the SPS update is applied, and update processing component 252 can accordingly apply one or more parameters related to the SPS update based on the delay as well.

In addition, in an example, the configuration may include parameters related to the feedback resources over which the UE 104 is to transmit feedback related to the SPS update, as described above and further herein. For example, the configuration may indicate frequency resources and/or offsets to use in transmitting the feedback specific to the SPS update, a time period (e.g., symbol/slot or offset to a symbol/slot) within which to transmit the feedback specific to the SPS update, etc.

In method 400, at Block 408, it can be determined whether a SPS update is received in the SPS update resources over the control channel. In an aspect, update processing component 252, e.g., in conjunction with processor(s) 212, memory 216, transceiver 202, SPS communicating component 142, etc., can determine whether the SPS update is received in the SPS update resources over the control channel. For example, update processing component 252 can, based on the received configured periodicity, the received offset, etc., check or otherwise monitor control channels from the base station 102 for the SPS update. For example, the SPS update can be sent in downlink control information (DCI) and scrambled with the UE's SPS-RNTI.

In this regard, in an example, determining whether the SPS update is received at Block 408 can optionally include (at least where it is determined that the SPS update is received), at Block 410, descrambling the SPS update based on an identifier assigned by the access point. In an aspect, update processing component 252, e.g., in conjunction with processor(s) 212, memory 216, transceiver 202, SPS communicating component 142, etc., can descramble the SPS update based on the identifier assigned by the access point. For example, the base station 102 can scramble the SPS update with the SPS-RNTI of the UE 104 where sent over the control channel. In this example, update processing component 252 can monitor the control channels for communications, and can attempt to descramble the communications by using the SPS-RNTI. Successful descrambling and/or decoding of the control channel communications using the SPS-RNTI can also serve as an indication that the control channel communications include the SPS update specific for the UE 104.

Where the SPS update is received in this regard, for example, update processing component 252 can process the SPS update, which may include applying different SPS configuration or parameter values, determining resources over which to transmit SPS communications, etc. In addition, where the SPS update is received in some examples, SPS communicating component 142 can communicate with the base station 102 over corresponding SPS resources indicated by or otherwise associated with the SPS update (e.g., to provide status information, apply parameter updates, to provide a keep-alive function, etc.). In an example, where a delay value is received in the configuration, SPS communicating component 142 can apply the SPS update based on the delay value. In this example, SPS communicating component 142 can initialize a timer based on the delay value and based on a time at or after which the SPS update is received, and can then apply the update such to use SPS resources indicated by the SPS update based on expiration of the timer.

In method 400, at Block 412, feedback can be transmitted to the access point to indicate whether the SPS update is received over the SPS update resources. In an aspect, feedback component 254, e.g., in conjunction with processor(s) 212, memory 216, transceiver 202, SPS communicating component 142, etc., can transmit feedback to the access point to indicate whether the SPS update is received over the SPS update resources. For example, feedback component 254 can transmit ACK feedback where the SPS update is received and/or is properly processed by the UE 104 (e.g., where cyclic redundancy check (CRC) passes, where descrambling/decoding the SPS update, and/or the like), and can transmit NACK feedback otherwise. For example, feedback component 254 can transmit NACK feedback where the SPS update is not received over the SPS resources determined based on the configured periodicity and/or where the SPS update is received but is not properly decoded or otherwise cannot be processed. In addition, feedback component 254 can transmit the feedback over determined feedback resources, which may be indicated in the configuration received from the base station 102 (e.g., as described with reference to Block 406), determined based on one or more configured parameters and when the SPS update is received (e.g., at a determined offset in time from the SPS update), etc.

In method 400, optionally at Block 414, the SPS update can be received in a subsequent time period based on indicating NACK feedback. In an aspect, update processing component 252, e.g., in conjunction with processor(s) 212, memory 216, transceiver 202, SPS communicating component 142, etc., can receive, based on the feedback component 254 indicating NACK for the original SPS update, the SPS update in the subsequent time period (e.g., in a subsequent PDCCH). For example, update processing component 252 can receive the SPS update in a next symbol or slot (or number of symbols or slots) defined by the wireless communication technology. In an example, the time period for receiving subsequent SPS updates where NACK is indicated may also be indicated in the configuration received from the base station 102 (e.g., as described with reference to Block 406), or can be otherwise received or known/configured at the UE 104. In any case, update processing component 252 may receive the SPS update before the next SPS update period and/or before the next SPS transmission opportunity based on the periodicity specified in the original SPS resource configuration. In this example, the method 400 may proceed to Block 412 to transmit feedback indicating whether the next SPS update is received.

In method 400, optionally at Block 416, the access point can be communicated with over updated SPS resources based on the SPS update (or next SPS update). In an aspect, SPS communicating component 142, e.g., in conjunction with processor(s) 212, memory 216, transceiver 202, etc., can communicate with the access point (e.g., base station 102) over the updated SPS resources based on the SPS update (e.g., or next SPS update). For example, SPS communicating component 142 can communicate with the access point by transmitting uplink communications over the updated SPS resources and/or receiving downlink communications over the updated SPS resources. The updated SPS resources can be those determined from or otherwise indicated by the SPS update, as described above. In an example, SPS communicating component 142 can determine to communicate over the updated SPS resources in this regard based on determining that ACK feedback is transmitted for the SPS update.

FIG. 5 illustrates a flow chart of an example of a method 500 for configuring SPS resources for a UE. In an example, a base station 102 can perform the functions described in method 500 using one or more of the components described in FIGS. 1 and 3.

In method 500, at Block 502, SPS communications can be activated with a UE over SPS resources. In an aspect, SPS configuring component 146, e.g., in conjunction with processor(s) 312, memory 316, transceiver 302, etc., can activate, with the UE (e.g., UE 104), SPS communications over the SPS resources. For example, as described, in activating SPS communications, the SPS configuring component 146 can determine and provide SPS configuration parameters to the UE 104, such as a periodicity and/or time duration for checking a control channel for SPS communication resources or a corresponding SPS resource grant, an identifier for the UE 104 that can be used to indicate a SPS resource grant or related parameters intended for the UE 104 (e.g., a SPS-RNTI used to scramble the SPS resource grant), and/or the like. In an example, SPS configuring component 146 can transmit the parameters to the UE 104 in higher layer signaling (e.g., RRC signaling). In addition, in activating the SPS communications for example, SPS configuring component 146 can transmit the SPS resource grant to the UE 104 based on the parameters (e.g., based on a time corresponding to the periodicity and/or time duration, etc.), and can encode the SPS resource grant (e.g., over a control channel) based on the SPS-RNTI.

In method 500, at Block 504, SPS update resources can be indicated as related to a configured periodicity for transmitting, over a control channel, SPS updates to SPS resource grants. In an aspect, updating component 352, e.g., in conjunction with processor(s) 312, memory 316, transceiver 302, SPS configuring component 146, etc., can indicate the SPS update resources related to the configured periodicity for transmitting, over the control channel, SPS updates to SPS resource grants. The base station 102 can use the SPS update resources to transmit SPS updates to the UE 104 based on the configured periodicity, which can provide a trackable mechanism for improving reliability of communications with the UE 104.

In an example, indicating the SPS update resources at Block 504 can optionally include, at Block 506, transmitting, to the UE, a configuration indicating the configured periodicity or one or more other parameters. In an aspect, updating component 352, e.g., in conjunction with processor(s) 312, memory 316, transceiver 302, SPS configuring component 146, etc., can transmit, to the UE (e.g., UE 104), the configuration indicating the configured periodicity or the one or more other parameters. For example, updating component 352 can transmit the configuration as part of the configuration for activating SPS resources or as a separate configuration. In addition, updating component 352 can transmit the configuration using higher layer signaling (e.g., RRC signaling). The configuration may indicate the configured periodicity for transmitting the SPS updates over the control channel to the UE 104, an offset in time (e.g., from a time determined based on the periodicity) for transmitting the SPS updates, a time duration during which the SPS updates may be transmitted, a delay value indicating when the SPS update is applied by the base station 102 to determine SPS update resources, an indication of feedback resources for transmitting feedback related to the SPS updates (e.g., an explicit indication of the resources, an offset in time and/or in frequency from receiving the SPS updates, etc.), and/or the like.

In method 500, at Block 508, an SPS update can be transmitted over the SPS update resources. In an aspect, SPS configuring component 146, e.g., in conjunction with processor(s) 312, memory 316, transceiver 302, etc., can transmit the SPS update over the SPS update resources. For example, SPS configuring component 146 can generate an SPS update that can modify one or more parameters for communicating over SPS resources, such as the SPS resources over which to communicate, or one or more other parameters, and can transmit the SPS update according to the configuration (e.g., based on the configured periodicity, offset, etc.).

In an example, transmitting the SPS update at Block 508 can optionally include, at Block 510, scrambling the SPS update based on an identifier assigned to the UE. In an aspect, SPS configuring component 146, e.g., in conjunction with processor(s) 312, memory 316, transceiver 302, etc., can scramble the SPS update based on the identifier assigned to the UE 104 (e.g., the SPS-RNTI), which may include scrambling a CRC portion of the SPS update so the UE 104 can identify the SPS update transmitted in the control channel by attempting to descramble the control channel communications using its SPS-RNTI. As described, the UE 104 can attempt to receive and/or decode the SPS update based on the configured periodicity, offset, etc., and can provide feedback indicating whether the SPS update was received and properly decoded or not.

Thus, in method 500, at Block 512, it can be determined whether feedback is received from the UE indicating whether the SPS update is received over the SPS update resources. In an aspect, feedback processing component 354, e.g., in conjunction with processor(s) 312, memory 316, transceiver 302, SPS configuring component 146, etc., can determine whether the feedback, indicating whether the SPS update is received over the SPS resources, is received from the UE (e.g., UE 104). For example, feedback processing component 354 can attempt to decode feedback over feedback resources related to the SPS update, which can be configured for the UE 104. Where the feedback indicates ACK, SPS configuring component 146 can determine that the UE 104 properly received and applied the SPS update, and thus the base station 102 can apply the SPS update for subsequently communicating with the UE 104.

Where the feedback indicates NACK or no feedback (e.g., the SPS update is not received), optionally at Block 514, the SPS update can be transmitted in a subsequent time period. In an aspect, updating component 352, e.g., in conjunction with processor(s) 312, memory 316, transceiver 302, SPS configuring component 146, etc., can transmit, based on receiving NACK feedback or no feedback, the SPS update in the subsequent time period. For example, updating component 352 can transmit the next SPS update as the original SPS update, which may be transmitted earlier than the next SPS update would be transmitted (e.g., in a PDCCH of a next symbol, set of symbols, a next slot, set of slots, etc.). In this example, the method 500 may proceed to Block 512 to determine whether the next SPS update is received.

In method 500, optionally at Block 516, the UE can be communicated with over updated SPS resources based on the SPS update (or next SPS update). In an aspect, SPS configuring component 146, e.g., in conjunction with processor(s) 312, memory 316, transceiver 302, etc., can communicate with the UE 104 over the updated SPS resources based on the SPS update (e.g., or next SPS update). For example, SPS configuring component 146 can communicate with the UE 104 by transmitting downlink communications over the updated SPS resources and/or receiving uplink communications over the updated SPS resources. The updated SPS resources can be those determined from or otherwise indicated by the SPS update, as described above. In an example, SPS configuring component 146 can determine to communicate over the updated SPS resources in this regard based on determining that ACK feedback is received from the UE 104 for the SPS update.

In method 500, optionally at Block 518, a next SPS update can be transmitted based on determining whether the feedback is received. In an aspect, updating component 352, e.g., in conjunction with processor(s) 312, memory 316, transceiver 302, SPS configuring component 146, etc., can transmit the next SPS update to the UE 104 based on determining whether the feedback is received. For example, updating component 352 can transmit the next SPS update as a new SPS update according to the configured periodicity, offset, etc., where the feedback indicates ACK. In this example, the base station 102 and UE 104 can communicate over the SPS resources as updated in the next SPS update FIG. 6 illustrates an example of resource allocations 600 in accordance with aspects described herein. For example, resource allocations 600 are depicted as frequency on a vertical axis and time on a horizontal axis. For a given set of periodic control and sensor traffic resources 602, PDCCH with SPS updates are shown at 604. Thus, for example, updating component 352 can configure and transmit the PDCCH with SPS updates at a configured periodicity and/or offset, where the periodicity may relate to a number of symbols and/or slots between updates, and the offset may relate to a number of symbols or slots past a starting symbol or slot that is to include the SPS update.

PDCCH portion 606 of a slot can optionally include a DCI indicating a PDSCH grant 608, and/or a DCI grant indicating SPS updates 610, as described above. For example, at least the DCI grant indicating SPS updates 610 can be scrambled with the SPS-RNTI, and update processing component 252 can detect and process the SPS updates based on descrambling the DCI with the SPS-RNTI. The slot can also include resources allocated for transmitting feedback for the PDSCH (e.g., resources 612) and/or feedback for the SPS update (e.g., resources 614). As described, resources 614 can be indicated in the configuration provided to the UE 104 by base station 102.

In this example, an access point (e.g., base station, gNB, etc., as referred to herein) may configure a UE 104 with a periodicity, T, and offset with which PDCCH with SPS update is sent (e.g., using RRC configuration). This can be sent with DCI scrambled with the UE's SPS-RNTI. The SPS update can be valid until the next update is sent, (e.g., for period T). The access point may also configure a delay before which SPS update is applied. From above, the UE 104 can know when to expect to receive the DCI indicating SPS updates 610, and can accordingly monitor PDCCH resources 606 during associated time periods for the SPS updates 610 (which can be determined by attempting to descramble and/or decode communications received over PDCCH 606 using the SPS-RNTI). In addition, the additional acknowledgment/non-acknowledgement (A/N) resource 614 is configured for UE to send feedback for SPS updates.

The UE 104 can send ACK if expected DCI with SPS update 610 is descrambled and/or decoded correctly (e.g., CRC check). UE 104 can send NACK in the A/N resource 614 if the expected DCI is not received or not decoded correctly. As the SPS update can be valid for a period, T ms, missing an update may imply loss of multiple subsequent physical downlink shared channel (PDSCH) transmissions, which may significantly impact achieving high reliability/survival time targets. In this regard, the A/N feedback over A/N resource 614 can enable the access point to resend the SPS update in a subsequent PDCCH opportunity, e.g., next slot, which may not necessarily correspond to the next configured SPS resources. Given that the SPS update can be applied with a delay, this may mitigate any impact on reliability due to SPS-update error.

Figure 7:
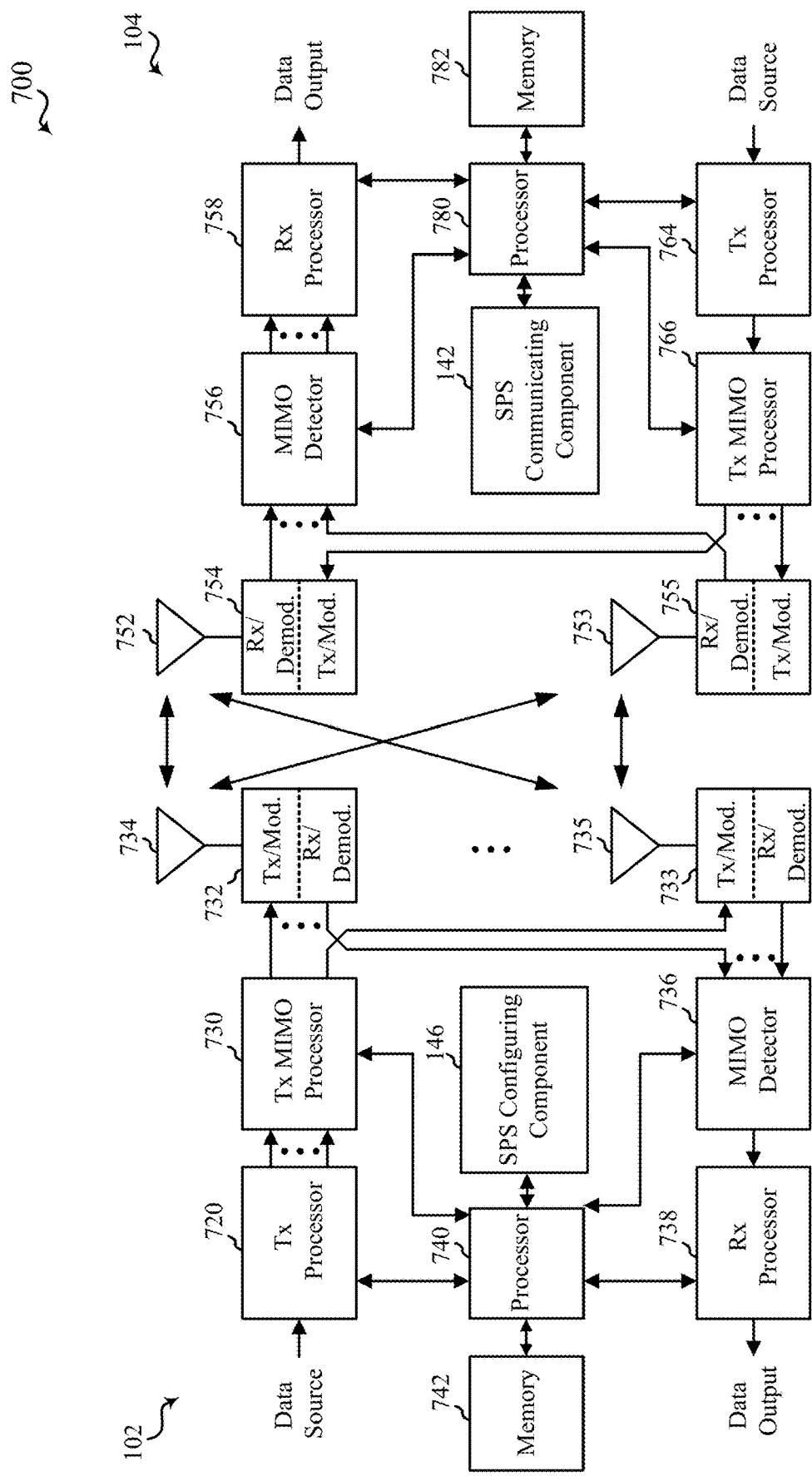
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a SPS communicating component 142 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a SPS configuring component 146 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disc and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for reporting feedback for semi-persistent scheduling (SPS) configuration updates, comprising:
   activating SPS communications for communicating over SPS resources with an access point based on an SPS resource grant that indicates a SPS periodicity configured for the SPS communications;
   receiving, over a control channel and over SPS update resources that are scheduled according to a configured SPS update periodicity that is different than the SPS periodicity, an SPS update that modifies the SPS resource grant to apply different SPS resources for communicating with the access point; and
   transmitting feedback to the access point, wherein the feedback indicates whether the SPS update is received over the SPS update resources.

2. The method of claim 1, further comprising receiving a configuration from the access point indicating the configured SPS update periodicity or one or more other parameters related to the SPS update resources.

3. The method of claim 2, wherein the configuration indicates a delay before which the access point applies the SPS update to the SPS resource grant.

4. The method of claim 1, further comprising descrambling the SPS update based on an identifier assigned by the access point for receiving the SPS update.

5. The method of claim 1, further comprising determining, based on a configuration received from the access point, feedback resources for transmitting the feedback to the access point.

6. The method of claim 1, further comprising, where transmitting the feedback includes transmitting a non-acknowledgement to the access point, receiving the SPS update in a subsequent time period, and applying the SPS update to transmit SPS communications to the access point over resources indicated in the SPS update as received in the subsequent time period.

7. The method of claim 1, further comprising, where transmitting the feedback includes transmitting an acknowledgement to the access point, receiving a next SPS update in subsequent SPS update resources based on the configured SPS update periodicity.

8. The method of claim 1, further comprising, where transmitting the feedback includes transmitting an acknowledgement to the access point, communicating with the access point over updated SPS resources based on the SPS update.

9. A method for updating a semi-persistent scheduling (SPS) configuration, comprising:
   activating SPS communications over SPS resources with a user equipment (UE) based on an SPS resource grant that indicates a SPS periodicity configured for the SPS communications;
   indicating SPS update resources that are scheduled according to a configured SPS update periodicity for transmitting, over a control channel, SPS updates that modify SPS resource grants to apply different SPS resources for communicating with the UE, wherein the configured SPS update periodicity is different than the SPS periodicity;
   transmitting, over the SPS update resources, an SPS update that modifies the SPS resource grant;
   determining whether feedback, indicating whether the SPS update is received over the SPS update resources, is received from the UE; and
   transmitting a next SPS update based on determining whether the feedback is received.

10. The method of claim 9, further comprising transmitting, to the UE, a configuration indicating the configured SPS update periodicity or one or more other parameters related to the SPS update resources.

11. The method of claim 10, wherein the configuration indicates a delay before which the SPS update is applied to the SPS resource grants.

12. The method of claim 9, further comprising scrambling the SPS update based on an identifier assigned to the UE for receiving the SPS updates.

13. The method of claim 9, wherein the feedback is received, and wherein transmitting the next SPS update comprises transmitting the SPS update in a subsequent time period based on determining that the feedback is non-acknowledgement.

14. The method of claim 9, wherein the feedback is not received, and wherein transmitting the next SPS update comprises transmitting the SPS update in a subsequent time period.

15. The method of claim 9, wherein the feedback is received, and wherein transmitting the next SPS update comprises transmitting a subsequent SPS update in subsequent SPS update resources based on determining that the feedback is acknowledgement.

16. The method of claim 9, further comprising transmitting, to the UE, a feedback configuration indicating feedback resources over which to transmit the feedback.

17. An apparatus for wireless communication, comprising:
   a transceiver;
   a memory;
   at least one processor communicatively coupled with the transceiver and the memory, wherein the at least one processor is configured to:
      activate SPS communications for communicating over SPS resources with an access point based on an SPS resource grant that indicates a SPS periodicity configured for the SPS communications;
      receive, over a control channel and over SPS update resources that are scheduled according to a configured SPS update periodicity that is different than the SPS periodicity, an SPS update that modifies the SPS resource grant to apply different SPS resources for communicating with the access point; and transmit feedback to the access point, wherein the feedback indicates whether the SPS update is received over the SPS update resources.

18. The apparatus of claim 17, wherein the at least one processor is further configured to receive a configuration from the access point indicating the configured SPS update periodicity or one or more other parameters related to the SPS update resources.

19. The apparatus of claim 18, wherein the configuration indicates a delay before which the access point applies the SPS update to the SPS resource grant.

20. The apparatus of claim 17, wherein the at least one processor is further configured to descramble the SPS update based on an identifier assigned by the access point for receiving the SPS update.

21. The apparatus of claim 17, wherein the at least one processor is further configured to determine, based on a configuration received from the access point, feedback resources for transmitting the feedback to the access point.

22. The apparatus of claim 17, wherein the at least one processor is further configured to, where transmitting the feedback includes transmitting a non-acknowledgement to the access point, receive the SPS update in a subsequent time period, and apply the SPS update to transmit SPS communications to the access point over resources indicated in the SPS update as received in the subsequent time period.

23. The apparatus of claim 17, wherein the at least one processor is further configured to, where transmitting the feedback includes transmitting an acknowledgement to the access point, receive a next SPS update in subsequent SPS update resources based on the configured SPS update periodicity.

24. The apparatus of claim 17, wherein the at least one processor is further configured to, where transmitting the feedback includes transmitting an acknowledgement to the access point, communicate with the access point over updated SPS resources based on the SPS update.

25. An apparatus for wireless communication, comprising:

a transceiver;

a memory;

at least one processor communicatively coupled with the transceiver and the memory, wherein the at least one processor is configured to:

activate SPS communications over SPS resources with a user equipment (UE) based on an SPS resource grant that indicates a SPS periodicity configured for the SPS communications;

indicate SPS update resources that are scheduled according to a configured SPS update periodicity for transmitting, over a control channel, SPS updates that modify SPS resource grants to apply different SPS resources for communicating with the UE, wherein the configured SPS update periodicity is different than the SPS periodicity;

transmit, over the SPS update resources, an SPS update that modifies the SPS resource grant;

determine whether feedback, indicating whether the SPS update is received over the SPS update resources, is received from the UE; and transmit a next SPS update based on determining whether the feedback is received.

26. The apparatus of claim 25, wherein the at least one processor is further configured to transmit, to the UE, a configuration indicating the configured SPS update periodicity or one or more other parameters related to the SPS update resources.

27. The apparatus of claim 26, wherein the configuration indicates a delay before which the SPS update is applied to the SPS resource grants.

28. The apparatus of claim 25, wherein the at least one processor is further configured to scramble the SPS update based on an identifier assigned to the UE for receiving the SPS updates.

29. The apparatus of claim 25, wherein the feedback is received, and wherein the at least one processor is configured to at least one of transmit the next SPS update as the SPS update in a subsequent time period based on determining that the feedback is non-acknowledgement or transmit a subsequent SPS update in subsequent SPS update resources based on determining that the feedback is acknowledgement.

30. The apparatus of claim 25, wherein the feedback is not received, and wherein the at least one processor is configured to transmit the next SPS update as the SPS update in a subsequent time period.

* * * * *